Feb. 28, 1933.  A. U. HOOK ET AL  1,899,274
CLUTCH MEMBER
Filed March 19, 1931
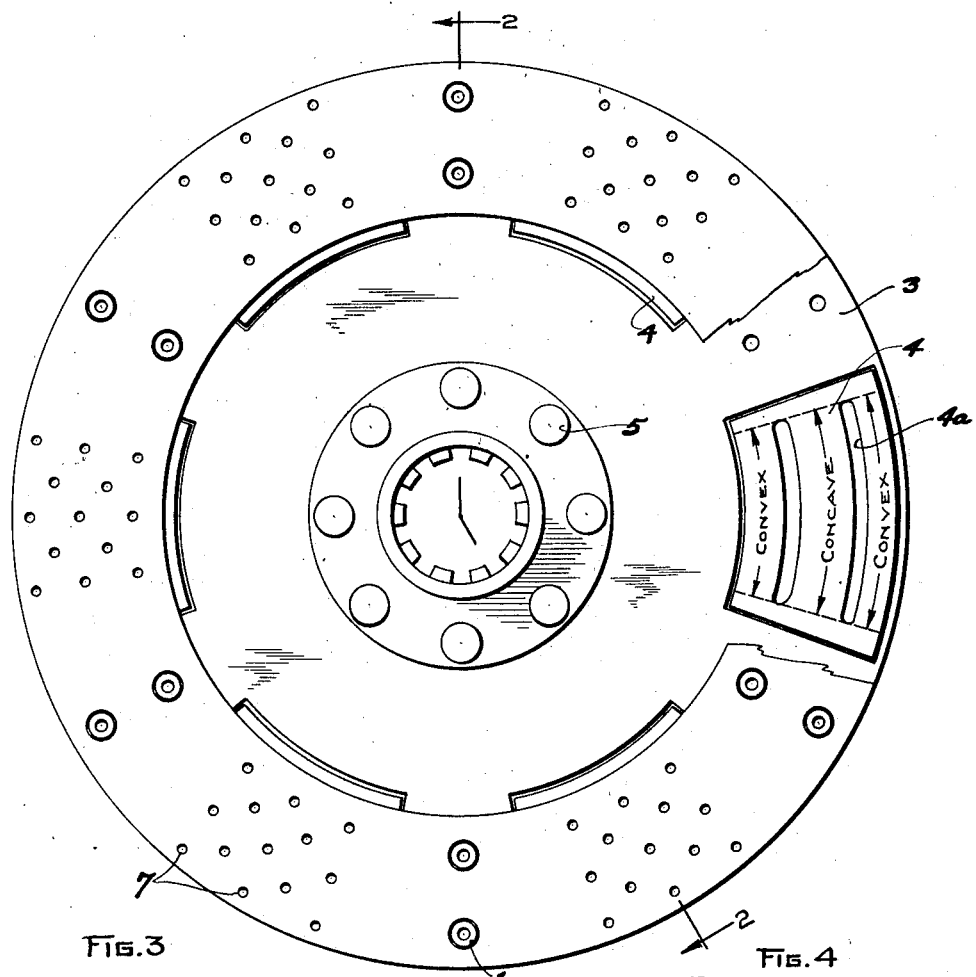
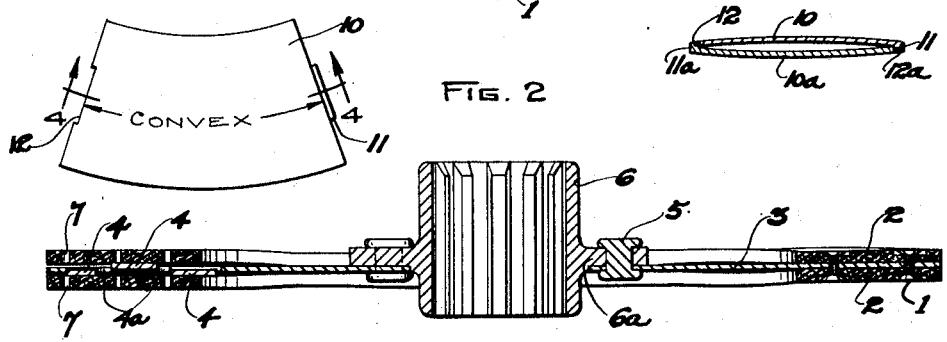
INVENTORS
ARLEY U. HOOK
EDWIN J. DUMM
BY
ATTORNEY Patented Feb. 28, 1933

1,899,274

UNITED STATES PATENT OFFICE

ARLEY U. HOOK AND EDWIN J. DUMM, OF UPPER SANDUSKY, OHIO; SAID HOOK ASSIGNOR TO SAID DUMM

CLUTCH MEMBER

Application filed March 19, 1931. Serial No. 523,710.

This invention relates to clutch members, such as are used in friction clutches, and it is especially suitable for automobile use, but of course not confined thereto.

The object of the invention is to provide a cushion action which when the clutch is engaged will first make a partial or high point contact which will start the load before the clutch is fully engaged, thereby producing a smooth clutch action.

A further object of the invention is to avoid any "vacuum" or suction between the clutch plates and the facings, which tends to cause chattering or grabbing of the clutch.

A further object of the invention is to provide a clutch which will be cheap and easy to manufacture, and avoiding spring steel disks formed under heat, which destroys the efficiency of the cushion or spring action, and often produces fracture of the metal.

The invention is illustrated in the accompanying drawing in which Fig. 1 is a plan of the clutch member. Fig. 2 is a section on the line 2—2 of Fig. 1. Fig. 3 is a modification of the clutch cushion. Fig. 4 is a section taken on line 4—4 of Fig. 3.

Referring particularly to the drawing, the hub of the clutch member is indicated at 6, to the flange 6a to which is riveted the disk 3, as indicated at 5. This disk may be made of low carbon steel and worked cold, thereby cheapening the manufacture and making a stronger disk than if heated.

The disk is blanked out and pierced to receive a series of steel springs or cushions 4, which as shown are slotted as at 4a to form three sections or legs two of which are sprung one way or convex and the middle one of which is sprung the other way or concave. This of course is optional. The result is to form a relatively flat spring with portions bowed in opposite directions.

These cushions, set in the disks, are covered and enclosed by the clutch facings 2 which may be made of fibre or any other suitable friction material and are riveted in place by the rivets 1, at opposite sides of the outer part of the disk. The effect of the springs 4 behind the facings, is to press the facings outwardly some extent, to form high spots which take hold first, but at complete engagement the cushions collapse or yield under pressure and all parts of the facing surface are in contact.

With ordinary facings a vacuum tends to be caused between the disk and the facing, with a tendency to cause chattering or grabbing. To remedy this, sets of holes 7 are made in the facings, permitting free escape or inlet of air as the facings are engaged.

A modification of the spring or cushion is shown in Figs. 3 and 4. The spring or cushion 10 has a lug 11 on the underside which may be integral with the spring or cushion 10, the lug 11 fits within the aperture 12a as the lug 11a fits within the aperture 12, thus the spring or cushion 10 is shown concave while the spring or cushion 10a is shown convex.

This clutch plate or member can be used with or as a part of various commercial forms of automobile or other friction clutches and has decided advantages as referred to above.

We claim:

A clutch member comprising a disk having a series of openings around the same, facings riveted at intervals to opposite sides of the disk between said openings, and a flat spring plate loosely confined in said openings between the facings, each spring plate being separate from the disk and having slots and oppositely bowed portions separated by said slots and pressing both facings outwardly from the disk.

In testimony whereof, we do affix our signatures.

ARLEY U. HOOK.
EDWIN J. DUMM.